M. Thompson,

Steam Boiler Furnace,

№ 398. Reissued Oct. 7, 1856.

UNITED STATES PATENT OFFICE.

MOSES THOMPSON, OF NEW ORLEANS, LOUISIANA.

IMPROVEMENT IN FURNACES FOR BURNING WET FUEL.

Specification forming part of Letters Patent No. 12,678, dated April 10, 1855; Reissue No. 398, dated October 7, 1856.

*To all whom it may concern:*

Be it known that I, MOSES THOMPSON, formerly of Henrico county, and State of Virginia, and now of New Orleans, in the State of Louisiana, have invented a new and useful Improvement in burning tan-bark, bagasse, saw-dust, and other kinds of fuel in a wet state, for the purpose of creating heat to generate steam or to be employed in heating or drying operations; and I do hereby declare that the following is a full, clear, and exact description of the same, reference being had to the accompanying drawings, forming part of this specification, in which—

Figure 1:
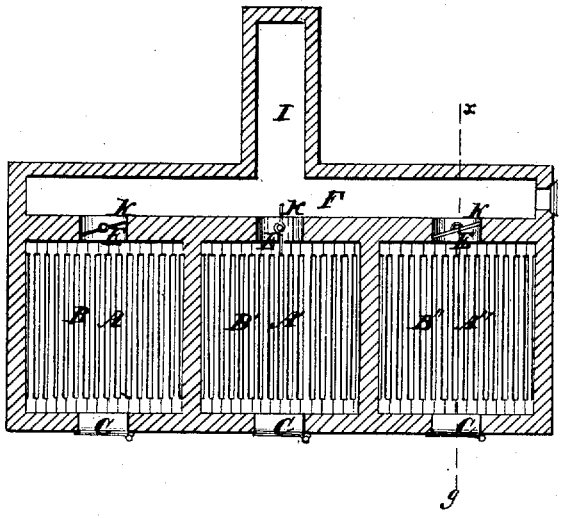
Figure 2:
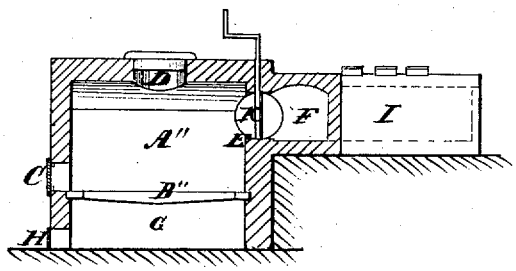

Figure 1 is a horizontal section of a furnace constructed according to my invention. Fig. 2 is a vertical section of the same in the line *x y* of Fig. 1.

Similar letters of reference indicate corresponding parts in the several figures.

The main object of my invention is to effect the more economical use, for fuel, of tan-bark, bagasse, or other trashy matters in a wet state, or very green or wet wood.

The nature of my invention consists in the employment, in the manner hereinafter described, of a series of fire-chambers arranged side by side or in any convenient way to admit of the whole series communicating with the same heating-flue or mixing-chamber, which said fire-chambers are furnished with dampers by which they respectively communicate with the air through the ash-pit, which may be closed or opened at pleasure. This arrangement is for the purpose of effecting the process of heating the wet charge to an intense degree in a nearly air-tight chamber, decomposing it to some extent, mingling the gasses from the different fire-chambers, and admitting a free supply of air to promote rapid combustion in the mixing-chamber, to be conducted without interruption to the operation which the heat generated is intended to effect.

To enable others skilled in the art to make and use my invention, I will proceed to describe its construction and operation.

The furnace shown in the drawings has three fire-chambers, A A A. Three is the number shown, as I consider that number in many cases to be best adapted to practical operation. In some cases two may be sufficient, and in others it requires more than three. In making these variations as to the number of chambers the builder is to be guided by the quantity of heat required, size of chambers, and character of fuel to be used.

The fire-chambers are of a square but may be of other form, with grate-bottoms B B B and arched tops; or said tops may be used or built of any other form adapted to the kind of fuel to be used. They are separated by a wall of fire-proof material and lined throughout with fire-brick, and in case of burning wet tan fire-brick grate should be used.

Each burning-chamber is provided with a door, C, in front for the purpose of lighting and tending the fire, with an opening, D, at the top for the purpose of supplying the fuel when it consists of tan-bark or other material of similar nature, and with an opening, E, at the back end of the chamber, which leads to the flue F or the mixing-chamber. The opening may be provided with a damper, K. Each fire-chamber has a separate ash-pit, G, below it, which is furnished with the door H, to regulate the admission of air. The flue or mixing-chamber F extends across the back of all the three fire-chambers, and the chimney may be at one end or may be placed in the rear, with the flue I leading to it from the flue F.

If the furnace is used for generating steam, the best place for the boiler will be in the flue I, which will be made of a proper size to receive and nearly surround it. If used for other purposes, any arrangement may be made best adapted to the application of said heat. The thing to be heated ought to be elevated from two to three feet above inside top of the fuel-chambers.

The current from the mixing-chamber, in passing to the place of use in the case of burning wet tan or other very wet fuel, should descend or pass under a bridge to the place of use equal to about one-half of the depth of the burning-chamber between the grate and the crown, then rise to the place of use. In case of dry or nearly dry fuel—such as green wood and sawdust—the current should rise immediately after leaving the burning-chambers to the place of use.

In using dry or nearly dry fuel, as above, the flue E, leading out of the fuel-chamber A into the flue or mixing-chamber F, should be increased to about threefold capacity of that used for very wet fuels, to be varied in proportion to the wetness or dryness of said fuel.

In case of burning of sawdust or green or wet wood, the chambers should be about double the grate-surface of what is commonly used for burning of wood to accomplish the same object; but for wet tan it should be increased to about fourfold.

The mode of conducting the operation of the furnace is as follows: Fires being lighted in all of the fire-chambers with dry fuel, and the masonry heated to a high degree, two of the three chambers A A are fed with wet fuel, and have their ash-pits closed and the damper K K partially closed, though this is not absolutely necessary. The other fire-chamber, having its charge partially dry, in the meantime has the damper K open, and the door of the ash-pit H opened far enough to admit any quantity of air which may be required to promote such a degree of combustion in the chambers as may be necessary to generate the amount of heat required. There should be no artificial blast, and if a high stack be used there should be a damper in it to moderate the draft. When the fuel in the open chamber is reduced to a desirable degree, its ash-pit is closed and the chamber recharged, and another opened and supplied with air until the fuel within is reduced, when it is closed, recharged, and another opened, each in its turn being opened and supplied with air to generate and supply the requisite amount of heat while the others are closed, and successively supplied with fresh fuel to heat and decompose the same to such a degree as is desirable before allowing rapid combustion to take place.

Each fire-chamber should be supplied successively with fuel at proper intervals by any convenient means either through the hole D or door C in front.

The principal advantage of a furnace and process of this description consists in heating the charge without any further loss of heat than is absorbed by the comparatively non-conducting material of which the furnace is constructed, and decompose it into such gases as will, when mingled in the mixing-chamber with the products of combustion from the active chamber, cause the most perfect combustion of the gases and smoke to be effected. This could not be effected in a single fire-chamber; but when two or more fire-chambers are employed no interruption takes place, and the object is readily attained.

Another advantage consists in always holding a certain quantity of heat and highly-heated fuel in reserve in the closed chambers, which may be immediately brought into action by opening one or more of the chambers. A similar but inferior result might be produced by having several grates and ash-pits to the same fire-chamber, each grate charged successively, and its ash-pit for a time closed immediately after fresh charging to exclude the air. I have described this in my caveat, on which my application is based, but do not use it because of its inferiority in practice, although it involves my principle.

After ample experiments I have discovered that any results which can be produced by the use of dry fuel are inferior to wet in proportion to quantity used, and that results like mine can only be attained by the use of wet fuel similar to what I have herein mentioned fed into an intensely-heated chamber. Under such circumstances the water in the fuel in the presence of the carbonaceous substances in the furnace will be decomposed, giving its oxygen to the carbonaceous matter, dispensing with a draft and its cooling and wasteful influence, and rendering the combustion so perfect that no smoke is visible.

In burning tan and sawdust where a large quantity of heat is to be made, in order to save the increase of their number, I put the chambers in twice as long as wide, and use two openings D to feed through, and thereby accomplish double to each chamber.

I do not claim the within-described arrangement of a series of fire-chambers to communicate with one common flue irrespective of the purpose for which and the manner in which I employ the said arrangement; but What I do claim as my invention, and desire to secure by Letters Patent, is—

The combustion, for the purposes of a high degree of heat, of bagasse, refuse tan, sawdust, and other wet refuse substance, or very wet and green wood, by the employment of a series of fire-chambers arranged in any manner, substantially as described, to communicate with one common flue or mixing-chamber, when any number of said chambers are nearly closed to the admission of air when first charged, as described, while the remaining chamber or chambers are in full communication with the flue, and has a free supply of air admitted, and the ash-pit of each chamber in its turn is nearly closed and then opened, and has air admitted, whereby the heat required is rendered continuous and comparatively uniform, while the fuel in some of the chambers is being heated and decomposed to a desirable degree, as herein set forth.

MOSES THOMPSON.

In presence of—
A. WOODMAN,
JAS. SALTER.